United States Patent [19]

Miller et al.

[11] Patent Number: 4,989,416
[45] Date of Patent: Feb. 5, 1991

[54] TUNNEL FREEZER

[75] Inventors: Jeremy P. Miller, Burton-on-Trent; John V. Summers, Great Missenden, both of United Kingdom

[73] Assignee: Air Products and Chemicals, Inc., Allentown, Pa.

[21] Appl. No.: 444,480

[22] Filed: Dec. 1, 1989

[30] Foreign Application Priority Data

Dec. 9, 1988 [GB] United Kingdom ............... 8828827

[51] Int. Cl.$^5$ ........................................... F25D 25/02
[52] U.S. Cl. ........................................ 62/381; 62/63
[58] Field of Search ....................... 62/63, 380, 381

[56] References Cited

U.S. PATENT DOCUMENTS

| | | | |
|---|---|---|---|
| 3,213,634 | 10/1965 | Granata | 62/381 |
| 3,611,737 | 10/1971 | Alaburda et al. | 62/374 |
| 3,889,488 | 6/1975 | Maeda et al. | 62/374 |
| 3,992,899 | 11/1976 | Spahn | 62/381 |
| 4,195,490 | 4/1980 | Soecknick et al. | 62/374 |
| 4,499,740 | 2/1985 | Older et al. | 62/380 |
| 4,528,819 | 7/1985 | Klee | 62/380 |
| 4,569,204 | 2/1986 | Ott et al. | 62/381 |
| 4,578,957 | 4/1986 | Cunningham | 62/381 |
| 4,761,962 | 8/1988 | Andersson | 62/381 |

Primary Examiner—Ronald C. Capossela

Attorney, Agent, or Firm—James C. Simmons; William F. Marsh

[57] ABSTRACT

A tunnel freezer comprises an elongate tunnel which is inclined to the horizontal and which can be rotated about its longitudinal axis. The inside of the tunnel is provided with a weir which retains a pool of liquid nitorgen between the weir and the upper end of the tunnel. Particles to be frozen are introduced into the tunnel on a conveyor and drop into the pool where they freeze substantially without aggregation. Rotation of the tunnel carries the particles out of the liquid nitrogen and through the remainder of the tunnel to the outlet end of the tunnel. The frozen particles and the nitrogen vapour from the tunnel pass through a common outlet which is provided with a pivoting plate which restricts the flow through the common outlet so that the tunnel operates at or slightly above atmospheric pressure thereby inhibiting ingress of moist air into the tunnel. Movement of particles through the tunnel is facilitated by lifting bars which form part of a liner which can be readily removed and replaced as desired. In a second embodiment the tunnel is provided with a spiral ribbon which forms a multiplicity of pools extending along the tunnel. This embodiment is particularly useful where the supply of frozen particles is variable.

19 Claims, 2 Drawing Sheets

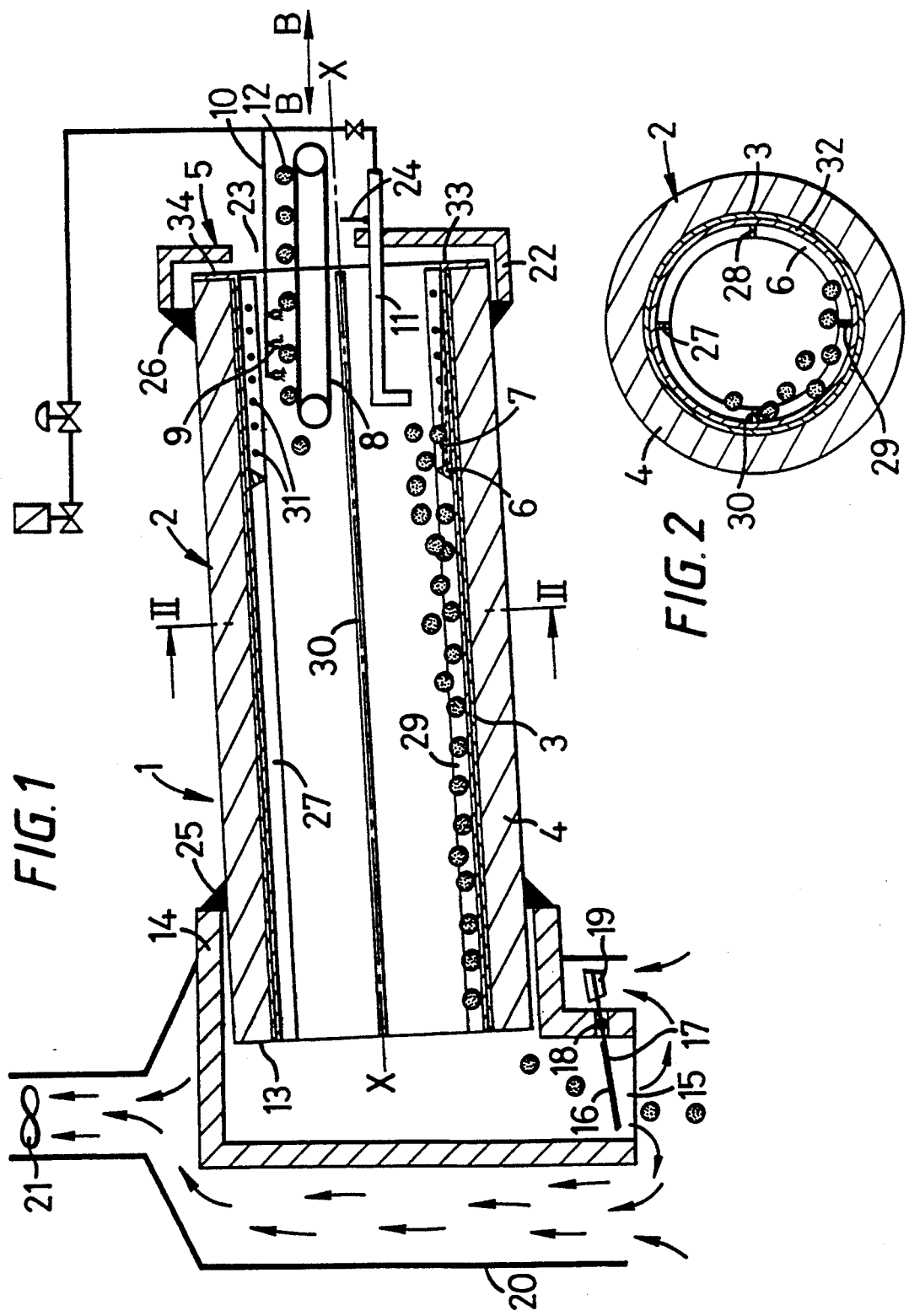

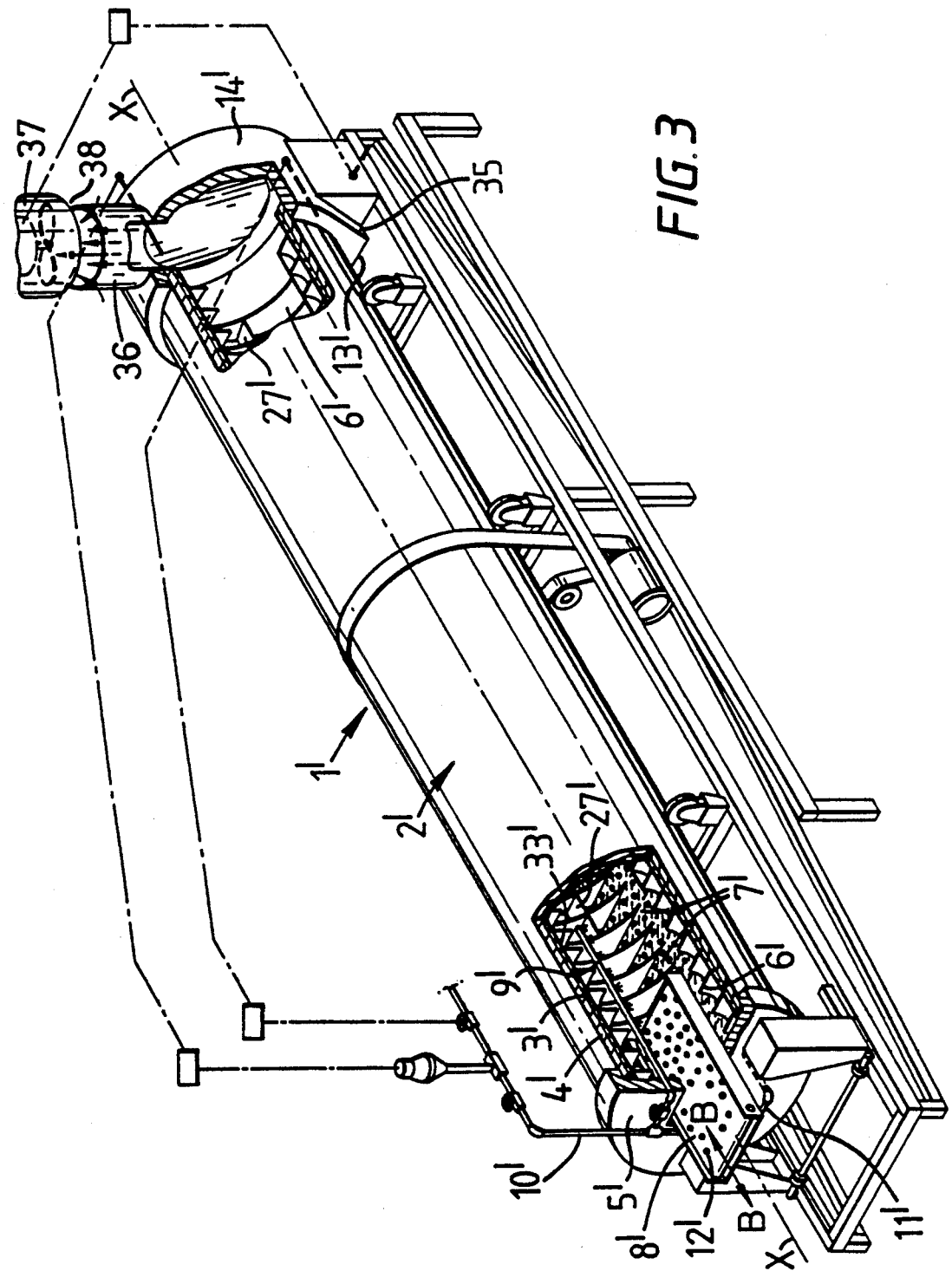

TUNNEL FREEZER

This invention relates to a tunnel freezer.

A tunnel freezer usually comprises an elongate tunnel of generally circular cross-section. In use, the tunnel is inclined to the horizontal and rotated about its longitudinal axis. Particles of material to be frozen are introduced into the upper end of the tunnel. The rotation of the tunnel causes the particles to press along the tunnel to the lower end where they are collected. As the particles pass along the tunnel they are frozen by heat-exchange with a cold medium, for example liquid nitrogen.

It will be appreciated that tunnel freezers are relatively inexpensive. However, they suffer from two major disadvantages. In particular:

1. If the particles of material are moist they tend to freeze in clusters; and
2. In use a certain amount of moist atmospheric air enters the tunnel. The moisture freezes out on the wall of the tunnel and forms a layer of ice which reduces the effective diameter of the tunnel and the throughput. In extreme cases particularly where the material is itself moist, the particles an freeze in the ice to totally block the tunnel.

The first disadvantage has limited the use of tunnel freezers to processes where the formation of clusters is not of particular significance, for example for embrittling material for cryogenic grinding. Thus, tunnel freezers have not been successfully used for producing high quality, individually quick-frozen foodstuffs, for example frozen prawns and celery.

The second disadvantage means that the tunnel freezer has to be stopped, cleaned and defrosted at relatively frequent intervals to maintain throughput.

In order to facilitate movement of the particles through the tunnel, the wall of the tunnel is normally provided with a plurality of longitudinally extending lifting bars which project towards the longitudinal axis of the tunnel. The optimum number, size and shape of the lifting bars varies according to the particles to be frozen. Heretofore, the lifting bars have been either permanently welded in position in the tunnel or bolted to lugs which are themselves permanently welded or otherwise retained on the tunnel. Consequently it has been a time-consuming and expensive operation to adapt the internal configuration of a tunnel freezer for a different application.

The present specification described three solutions which specifically address each of the above problems.

Dealing firstly with the problem of freezing in clusters UK-A-2 131 142 describes a food freezer in which particles to be frozen are first dropped into a bath of liquid nitrogen. The vaporizing nitrogen forms a thin layer around each particle which inhibits the particles sticking together. The particles stay in the liquid for a sufficient time for the surface to freeze and are then withdrawn upwardly from the liquid by a ribbon auger which conveys the particles through a cooling tunnel where they freeze throughout in contact with cold nitrogen vapour. Whilst this arrangement works extremely successfully the food freezer itself is relatively expensive because of the manufacturing cost of the ribbon auger.

The first aspect of the present invention provides a tunnel freezer comprising an elongate tunnel which can be inclined to the horizontal and which can be rotated about its longitudinal axis in use, characterized in that the inside of said tunnel is provided with a weir which, in use, traps a pool of cryogenic liquid near the inlet end of said tunnel, and means are provided for introducing material to be frozen into said pool.

When the tunnel freezer is in use particles to be frozen are introduced into the cryogenic liquid and their surfaces are frozen with minimal aggregation. The rotation of the tunnel transfers the particles along the tunnel.

Whilst this arrangement can work extremely well when the supply of particles to be frozen is relatively uniform we have found that the particles may not be uniformly frozen when the supply is erratic. This tends to be the case when the particles being frozen are particles of foodstuff.

In order to reduce this problem we have found that the tunnel should be provided with two or more weirs.

Advantageously, the weirs are formed by a spiral ribbon which is mounted on the inside of the tunnel. In use, the tunnel is rotated so that successive pools of cryogenic liquid progressively travel towards the outlet end of the tunnel. The flow of cryogenic liquid supplied can be adjusted with a view to obtaining minimal aggregation and adequate freezing of the particles.

Preferably, lifting bars are provided which may extend between the inlet of the tunnel and the weir closest thereto and/or between adjacent weirs. Such lifting bars may, for example be provided with a multiplicity of holes to allow cryogenic liquid (but not the particles) to flow back into the associated pool. Alternatively, the lifting bars may be mounted with a small clearance from the inside of the tunnel to allow the cryogenic liquid to flow back into the associated pool. The shape and configuration of the lifting bars may be chosen to facilitate movement of the particles along the tunnel or may be chosen simply to reduce aggregation.

When the weirs are formed by a spiral ribbon lifting bars may be provided along the entire length of the spiral ribbon or along a selected portion only. In a particularly preferred embodiment the spiral ribbon extends over the entire length of the tunnel and the lifting bars extend from the lower end to a position intermediate the inlet and outlet ends.

The tunnel freezer may be provided with a conventional inlet chute through which particles to be frozen can be introduced. More preferably, however, a conveyor is provided which is arranged to drop particles into a pool. Such a conveyor is preferably movable longitudinally with respect to the pool(s) so that the residence time of the particles in the pool(s) can be varied as required.

When a conveyor is used a spray bar is preferably situated in the tunnel above the conveyor so that cryogenic liquid can be sprayed on to the particles while they are on the conveyor. Such a spray bar may be the sole source of cryogenic liquid to the freezer. Alternatively, or in addition, the cryogenic liquid may be introduced directly to the pool.

Turning now to the second problem (frosting caused by ingress of moist air) it should first be recalled that venting equipment is usually provided with all tunnel freezers to prevent the build-up of asphyxiating cryogenic vapour in the area around the freezer. The venting equipment is normally disposed in direct contact with the tunnel and, in practice, the pressure inside the tunnel is usually fractionally below atmospheric. Because of this pressure differential air is sucked into the system and moisture condenses on the inside of the tunnel.

The second aspect of the present invention provides a tunnel freezer comprising an elongate tunnel which can be inclined to the horizontal and which can be rotated about its longitudinal axis in use, said tunnel having an inlet end for receiving particles to be frozen and an outlet end, characterized in that said outlet end is rotatably mounted within an enclosure having a common outlet for frozen particles and cryogenic vapour and means are provided for restricting the flow through said common outlet.

In use, the required flow of cryogenic liquid to the freezer is first established. The means are then adjusted so that the tunnel itself is at atmospheric pressure or, more preferably, at a very small positive pressure with respect to atmospheric pressure thereby inhibiting the ingress of atmospheric air into the tunnel.

Care should be taken to minimize any possible sources of air ingress into the tunnel and advantageously, at least one seal is provided between said tunnel and said enclosure for this purpose.

The means for restricting the flow through the common outlet may comprise, for example a plate which can be moved to restrict the flow through the common outlet. A particularly suitable means comprises a pivotally mounted plate which is biased to partially close the common outlet, for example by a counterweight. In use, frozen particles accumulate on the plate until they reach a certain weight. The plate then pivots downwardly and the particles slide off. The lighter plate then pivots back to its initial position.

Care must also be taken to inhibit air entering the tunnel via the inlet end. In the case where particles are delivered from a conveyor which projects into the inlet end of the tunnel care should be taken to ensure that a minimal volume of air enters the tunnel. However, care should also be taken to ensure that excess nitrogen does not leave the tunnel via the inlet end.

Preferably, an exhaust duct having an extractor fan is arranged to exhaust gas leaving the common outlet. The exhaust fan is preferably controlled in response to a sensor monitoring, for example the temperature, or the composition of the gas, immediately adjacent the inlet to the tunnel.

The exhaust duct may be connected directly to the common outlet. However, it is preferably arranged in the vicinity of the common outlet so that a mixture of cryogenic vapour and air is drawn into the exhaust.

Turning now to the third problem, known tunnels normally incorporate four longitudinally extending lifting bars. The tunnel and the lifting bars are normally both made of stainless steel and are normally welded together.

Recent work which we have carried out strongly suggests that the operation of tunnel freezers can be enhanced by using lifting bars of a shape and configuration which is particularly adapted for the particles being frozen. However, in order to change the lifting bars it is necessary to dismantle the entire tunnel which is a time-consuming and expensive operation.

In order to meet this problem the present invention provides a tunnel freezer comprising a tunnel which can be inclined to the horizontal and which can be rotated about its longitudinal axis, said tunnel having at least one weir and/or a multiplicity of lifting bars for facilitating the passage of particles of material along said tunnel, characterized in that said weir and/or said lifting bars form part of a liner which can be inserted and withdrawn from said tunnel.

Preferably, the liner is provided with a flange which can be bolted to the inlet or the outlet of said tunnel.

Advantageously, liners are made in discrete lengths which can be bolted or otherwise secured together to make a liner of appropriate overall length to fit in a tunnel.

Preferably, the liners are fabricated from stainless steel.

It will be appreciated that in order to change the internal shape and configuration of a tunnel the liner simply has to be withdrawn and replaced with a new liner. This operation takes a fraction of the time and expense previously involved.

For a better understanding of the present invention reference will now be made, by way of example, to the accompanying drawing, in which:

FIG. 1 is a simplified cross-section through one embodiment of a tunnel freezer in accordance with the present invention in use;

FIG. 2 is a simplified cross-section taken on line II—II of FIG. 1; and

FIG. 3 is a partly cut-away perspective view of another embodiment of a tunnel freezer in accordance with the invention.

Referring to FIG. 1 of the drawing there is shown a tunnel freezer which is generally identified by reference numeral 1. The tunnel freezer 1 comprises a tunnel 2 which is of circular cross-section. The tunnel 2 comprises a stainless steel tube 3 which is lagged with insulation 4 to reduce heat transfer.

The tunnel 2 is inclined to the horizontal and is rotatable about its longitudinal axis X—X. The tunnel 2 is supported on bearings (not shown) and is rotatable by an endless belt (not shown) which passes over a gear wheel fast with the tunnel 2 and driven by a variable speed motor (not shown).

Adjacent its upper end 5, the tunnel 2 is provided with a weir 6 which extends around the entire internal diameter of the tunnel 2 and projects radially inwardly. Since the tunnel 2 is inclined to the horizontal a pool 7 is defined between the weir 6 and the upper end 5 of the tunnel 2.

A conveyor 8 projects into the upper end 5 of the tunnel 2 and can be moved back and forth in the direction of arrows B—B as desired.

A spray bar 9 which is connected to a source of liquid nitrogen via a pipe 10 is disposed directly above the conveyor 8 as shown. A pipe 11, which is also connected to the same source of liquid nitrogen, is also disposed above the pool 7.

In use, the tunnel 2 is rotated about its longitudinal axis X—X. Particles 12 to be frozen, for example chopped celery, prawns, diced ham, herbs, minced meat and diced chicken, are introduced into the tunnel 2 on conveyor 8. The particles are first passed through liquid nitrogen being sprayed from spray bar 9 and then drop into the pool 7 which is full of liquid nitrogen.

As the particles drop into the liquid nitrogen they are surrounded by a thin film of boiling nitrogen which inhibits adjacent particles sticking together whilst freezing the surface.

As the tunnel 2 rotates the particles tumble over the weir 6 and move towards the outlet end of the tunnel 2. As they pass along the tunnel 2 the particles are further cooled by heat exchange with cold nitrogen vapour from the spray bar 9 and the pool 7. The particles leave the tunnel 2 at the outlet end 13.

It will be noted that the arrangement disclosed possesses substantially all the individual freezing benefits of an immersion freezer with the economic benefits of a tunnel freezer.

Returning again to FIG. 1 it will be seen that the outlet end 13 of the tunnel 2 extends into an enclosure 14 which has a common outlet 15 for both frozen particles and cold nitrogen vapour. A plate 16 extends across the common outlet 15 and is connected to an arm 17 which is pivoted about a pin 18. A counterweight 19 is mounted on the arm 17 and biases the plate 16 into the position shown. It should be noted that the plate 16 is not a tight fit in the common outlet 15.

The common outlet 15 is contained within a hood 20 which is provided with insulation and forms part of a duct containing an extractor fan 21.

The inlet end 5 of the tunnel 2 is provided with a surround 22 which is provided with an opening 23 to accommodate the conveyor 8.

In use gaseous nitrogen passes along the tunnel 2 and flows downwardly towards the common outlet together with frozen particles. The frozen particles collect on the plate 16 whilst the gaseous nitrogen flows through the gaps between the periphery of the plate 16 and the common outlet 15. Part of the gaseous nitrogen also flows through the opening 23.

A temperature sensor 24 located in the immediate vicinity of the opening 23 monitors the temperature and adjusts the displacement of the fan 21 to maintain the temperature slightly below room temperature. It will be appreciated that this temperature corresponds to a small flow of nitrogen outwardly from the tunnel through the opening 23.

As can be seen from FIG. 1 the hood 20 vents both nitrogen from the common outlet 15 and some surrounding air. This reduces freezing problems in the hood 20.

It will also be noted that seals 25 and 26 are provided to inhibit the ingress of air between the tunnel 2 and the enclosure 14 and between the tunnel 2 and the surround 22 respectively.

Finally, it will be noted that the tunnel is provided with four lifting bars 27, 28, 29 and 30 which extend along the tunnel 2 and which project radially inwardly.

As shown in FIG. 1, the portions of the lifting bars 27, 28, 29 and 30 between the weir 6 and the inlet end 5 of the tunnel 2 are provided with a multiplicity of small holes 31 so that the liquid nitrogen remains in the pool 7 as the drum rotates. The holes 31 are smaller than the particles.

As can best be seen from FIG. 2, the lifting bars 27, 28, 29 and 30 and the weir 6 are welded to a thin tube 32 of stainless steel. The tube 32 and the lifting bars 27, 28, 29 and 30 together form a liner which is generally identified by reference numeral 33. The liner 33 also includes a flange 34 which is bolted to the tunnel 2 by bolts (not shown).

The liner 33 shown in the figures can be renewed simply by removing conveyor 8 and surround 22. The bolts (not shown) securing the flange 34 to the tunnel 2 are removed and the entire liner 33 withdrawn. A new liner can then be inserted into the tunnel 2 and bolted into place.

Various modifications to the arrangement described are currently envisaged, for example the liner 33 could comprise a plurality of units which can be fastened together prior to insertion in the tunnel 2. In addition, additional clamps may be provided which project through the tunnel 2 to hold the liner 33 in position.

Typically the tunnel 2 will be rotated at from 0-8 r.p.m. and will be inclined at from 2 to 6 degrees, preferably 3 to 4 degrees from the horizontal.

EXAMPLE 1

A test tunnel 2 having an internal diameter of 0.4 m and a length of 3 m was inclined at 3.24 degrees to the horizontal and rotated at 3.125 r.p.m. The tunnel 2 successfully froze 180 kg/h chopped celery using 252 kg/h liquid nitrogen.

EXAMPLE 2

A test tunnel 2 having an internal diameter of 0.5 m and a length of 5 m was inclined at 4 degrees to the horizontal and rotated at 7.2 r.p.m. The tunnel 2 successfully froze 66 kh/h parsley using 85.8 kg/h liquid nitrogen. An unexpected benefit of this process was the almost total separation of the leaves of parsley from the stems and other woody material.

Turning now to FIG. 3, there is shown a tunnel freezer which is generally similar to the tunnel freezer shown in FIGS. 1 and 2. Parts in FIG. 3 which are similar to parts shown in FIGS. 1 and 2 have been identified by the same reference numerals with the addition of an apostrophe.

The tunnel freezer 1' differs from the tunnel freezer 1 in several respects. Firstly, the weir 6 has been replaced by a spiral ribbon 6' which is welded to a liner 33' which is secured to the stainless steel tube 3'. The spiral ribbon 6' extends the full length of the tunnel 2' and defines a plurality of weirs. A plurality of lifting bars 27' are provided between adjacent weirs from the outlet end 13' of the tunnel freezer 1 to a position approximately one fifth the distance from the inlet end 5' to the outlet end 13' of the tunnel 2'.

The outlet end 13' of the tunnel 2' extends into an enclosure 14' which has a downwardly opening outlet 35 for frozen particles and an outlet tube 36 which extends upwardly into an exhaust duct 37 which contains an exhaust fan (not shown). A gap 38 is provided between the outlet tube 36 and the exhaust duct 37 to allow ambient air to enter the exhaust duct 37 and inhibit ice forming on the inside of the exhaust duct 37.

Although the tunnel 2' is preferably inclined downwardly at 1-2 degrees to the horizontal to facilitate water drainage during cleaning it will be appreciated that it could be disposed level or even inclined slightly upwardly.

What is claimed is:

1. A freezer comprising in combination an elongated tunnel having a generally cylindrical shape, said tunnel being adapted for inclination at an angle to horizontal; said tunnel having a first or inlet end and a second or discharge end;

means to rotate said tunnel about its longitudinal axis;

means disposed adjacent said inlet end to trap and maintain a pool of liquid cryogen proximate said inlet end of said tunnel;

means disposed along the length of the interior of said tunnel to enable product to be moved inside said tunnel from said inlet end to said discharge end;

means to introduce said product into said pool adjacent said inlet end of said tunnel; and means to introduce liquid cryogen onto said product as it enters said tunnel and into said means to form said pool of liquid.

2. A freezer according to claim 1 wherein said means to trap and maintain said pool of liquid cryogen includes a weir disposed around the inner circumferential of said tunnel.

3. A freezer as claimed in claim 2 wherein there are at least two weirs.

4. A freezer as claimed in claim 3 wherein said weirs are formed by a spiral ribbon which is mounted on the inside of said tunnel.

5. A freeze according to claim 1 wherein said means to move said product includes a plurality of lifting bars disposed longitudinal in the interior of said tunnel nd extending from said inlet end toward said outlet end of said tunnel.

6. A freezer as claimed in claim 5, wherein said lifting bars are provided with a multiplicity of holes to allow cryogenic liquid to drain back into a pool when said freezer is in use.

7. A freezer according to claim 1 wherein said means to trap and maintain said pool of liquid cryogen includes a continuous spiral ribbon disposed in the inner wall of said tunnel from said inlet end to said discharge end.

8. A freezer according to claim 1 wherein said means to trap and maintain said pool of liquid and said means to move product inside said tunnel include a combination of spiral ribbon disposed on the inner wall of said tunnel from said inlet to said discharge end and a plurality of lifting bars disposed between adjacent flights of said spiral from said outlet end to a location proximate said inlet end.

9. A freezer according to claim 8 wherein said lifting bars extend for approximately four-fifths of the distance from said outlet end to said inlet end.

10. A freezer according to claim 1 wherein said tunnel is constructed and arranged to be removably disposed within a complimentary shaped insulated tunnel freezer.

11. A freezer according to claim 1 including an enclosure disposed proximate said outlet of said tunnel to collect said product as it exits said tunnel along with cryogenic vapor said enclosure including means to restrict flow of vapor and product therethrough.

12. A freezer as claimed in claim 11, wherein at least one seal is provided between said tunnel and said enclosure.

13. A freezer as claimed in claim 11, wherein said means for restricting the flow through said common outlet comprises a pivotably mounted plate which is biased to partially close said common outlet.

14. A freezer as claimed in claim 11, including an exhaust duct having an exhaust fan arranged to exhaust gas leaving said enclosure.

15. A freezer as claimed in claim 14, wherein said exhaust fan is controlled, in use, in response to a sensor disposed immediately adjacent the inlet to said tunnel.

16. A freezer as claimed in claim 14, wherein said duct is disposed in the vicinity of an outlet to said enclosure so that, in use, a mixture of cryogenic vapour and air is drawn into said exhaust duct.

17. A freezer as claimed in claim 1, wherein said means to introduce product to be frozen includes a conveyor which is arranged to drop product into said pool of liquid cryogen when said freezer is in use.

18. A freezer as claimed in claim 8, wherein said conveyor is movable longitudinally with respect to said pool(s) so that the residence time of said particles in the pool(s) can be varied.

19. A freezer as claimed in claim 17 wherein said means to introduce liquid cryogen onto said product includes a spray bar situated in said tunnel above said conveyor so that cryogenic liquid can be sprayed on to said particles while they are on said conveyor.

* * * * *